United States Patent
Herman et al.

(10) Patent No.: US 7,848,950 B2
(45) Date of Patent: *Dec. 7, 2010

(54) METHOD AND APPARATUS FOR COLLABORATIVE FILTERING OF CARD MEMBER TRANSACTIONS

(75) Inventors: Paul A. Herman, Cave Creek, AZ (US);
Greg M. Keeley, New York, NY (US);
Vernon Marshall, Montclair, NJ (US);
Paula S. Schwalje, Chandler, AZ (US);
Brian J. Yasz, Cave Creek, AZ (US)

(73) Assignee: American Express Travel Related Services Company, Inc., New York, NY (US)

( * ) Notice: Subject to any disclaimer, the term of this patent is extended or adjusted under 35 U.S.C. 154(b) by 547 days.

This patent is subject to a terminal disclaimer.

(21) Appl. No.: 11/315,262

(22) Filed: Dec. 23, 2005

(65) Prior Publication Data
US 2006/0143072 A1 Jun. 29, 2006

Related U.S. Application Data

(60) Provisional application No. 60/639,472, filed on Dec. 28, 2004.

(51) Int. Cl.
*G06Q 30/00* (2006.01)
(52) U.S. Cl. ............... 705/14.52; 705/14.53; 705/14.49
(58) Field of Classification Search ............... 705/14.52, 705/14.53, 14.49, 14.4
See application file for complete search history.

(56) References Cited

U.S. PATENT DOCUMENTS

| 4,996,642 | A | 2/1991 | Hey |
|---|---|---|---|
| 5,680,305 | A | 10/1997 | Apgar |
| 5,790,426 | A | 8/1998 | Robinson |
| 5,884,282 | A | 3/1999 | Robinson |
| 6,026,370 | A | 2/2000 | Jermyn |
| 6,064,980 | A | 5/2000 | Jacobi et al. |
| 6,236,974 | B1 | 5/2001 | Kolawa et al. |
| 6,266,649 | B1 * | 7/2001 | Linden et al. ............... 705/26 |
| 6,356,879 | B2 | 3/2002 | Aggarwal et al. |

(Continued)

FOREIGN PATENT DOCUMENTS

WO WO 2008/021056 2/2008

OTHER PUBLICATIONS james Gleick, If you like Morzart, you might like Madonna.., May 26, 2002 The Ottawa Citizen, p. C.2.*
International Search Report for Appln. No. PCT/US2007/017495 issued Aug. 27, 2008, 4 pgs.
Non-final Rejection mailed Aug. 5, 2008 in U.S. Appl. No. 11/500,492.

(Continued)

*Primary Examiner*—Michael Bekerman
*Assistant Examiner*—Daniel M Sorkowitz
(74) *Attorney, Agent, or Firm*—Snell & Wilmer L.L.P.

(57) ABSTRACT

The disclosed system allows a credit or charge card issuer to provide its card members with a list of merchants, products, services, vacation destinations or other offerings that might be of interest based on the purchases of similar card members. In one instance, this process looks at all card members that made purchases at a merchant and then it identifies all other merchants in the same category where those card members also made purchases. The associated merchants are ranked based on largest number of shared card members and the top results may be shared with card members or merchants in order to enhance promotions, card use and marketing.

11 Claims, 4 Drawing Sheets

U.S. PATENT DOCUMENTS

| | | |
|---|---|---|
| 6,505,168 B1 | 1/2003 | Rothman et al. |
| 6,782,370 B1 | 8/2004 | Stack |
| 7,082,407 B1 * | 7/2006 | Bezos et al. ............ 705/26 |
| 2003/0140023 A1 | 7/2003 | Ferguson et al. |
| 2003/0149623 A1 | 8/2003 | Chen |
| 2004/0225509 A1 * | 11/2004 | Andre ............ 705/1 |
| 2006/0143072 A1 | 6/2006 | Herman et al. |
| 2006/0143075 A1 | 6/2006 | Carr et al. |
| 2007/0143172 A1 | 6/2007 | Bhagchandani et al. |

OTHER PUBLICATIONS

Final Rejection mailed Mar. 31, 2009 in U.S. Appl. No. 11/500,492.
Advisory Action mailed Jul. 22, 2009 in U.S. Appl. No. 11/500,492.
Non-final Rejection mailed Oct. 28, 2009 in U.S. Appl. No. 11/500,492.
Notice of Allowance mailed Mar. 24, 2010 in U.S. Appl. No. 1/500,492.

* cited by examiner

300

| FIRST MERCHANT ID 302 | SECOND MERCHANT ID 304 | # CARD MEMBERS VISITING BOTH 306 | #TRANS-ACTIONS AT SECOND MERCHANT 308 | RATIO 310 | ALGORITHM RANKING 312 |
|---|---|---|---|---|---|
| A100 | B200 | 1 | 1 | 1.00 | 1 |
| A100 | B201 | 300 | 3800 | 0.08 | 534 |
| A100 | B202 | 245 | 1100 | 0.22 | 784 |
| A100 | A108 | 102 | 56500 | 0.00 | 104 |
| A100 | C555 | 70 | 2500 | 0.03 | 89 |
| A100 | A101 | 5 | 20 | 0.25 | 10 |
| A100 | N220 | 11 | 12 | 0.92 | 84 |
| A100 | A440 | 4 | 5 | 0.80 | 12 |

FIG. 3

| PRIMARY MERCHANT 402 | HIGHEST RANKED MERCHANT 404 | SECOND HIGHEST RANKED MERCHANT 406 | THIRD HIGHEST RANKED MERCHANT 408 | FOURTH HIGHEST RANKED MERCHANT 410 | FIFTH HIGHEST RANKED MERCHANT 412 |
|---|---|---|---|---|---|
| A100 | B202 | B201 | A108 | C555 | N220 |
| A101 | B801 | R300 | C421 | A228 | C144 |
| A102 | B764 | C335 | A111 | B564 | H100 |
| A103 | C600 | F327 | I098 | I123 | T102 |

METHOD AND APPARATUS FOR COLLABORATIVE FILTERING OF CARD MEMBER TRANSACTIONS

CROSS REFERENCE TO RELATED APPLICATIONS

This application claims priority under 35 U.S.C. §119(e) to U.S. Provisional Patent Application No. 60/639,472, filed Dec. 28, 2004, which is incorporated by reference herein in its entirety.

BACKGROUND

1. Field of the Invention

This invention generally relates to financial data processing, and in particular it relates to incentive and promotional programs.

2. Related Art

Consumers are constantly searching for information on products and services that may be of interest to them, but with which they have no actual experience. They typically seek independent information before making certain purchases. Various sources provide reports on products and services to satisfy this consumer demand for information. For example, ZAGATS provides ratings on restaurants and CONSUMER REPORTS provides detailed listings on product quality and customer satisfaction. When making a purchase of a selected product on web sites such as AMAZON.COM, information is typically provided about other products purchased by customers who have also purchased the selected product.

Consumers frequently use credit, debit, stored value or charge cards (collectively referred to herein as credit instruments) in transactions with various merchants. This data is collected and processed en mass by credit providers for billing purposes and the like. However, little has been done to harness such card member transaction details for marketing purposes.

BRIEF DESCRIPTION

Accordingly, the present disclosure introduces a system for processing financial transaction data, referred to herein as collaborative filtering, in which transaction data between card members and merchants is captured and analyzed for marketing purposes.

According to various embodiments of the disclosed processes, a plurality of merchants having transactions with card members are grouped based on an industry code and their geographic location. For each merchant, the system determines its total number of financial transactions involving card members over a period of time. The system then selects a first merchant from the group and identifies all card members that have had at least one financial transaction with the first merchant over the period of time. The system next determines, for each remaining merchant in the group, the number of card members having at least one financial transaction with both the first merchant and the remaining merchant over the period of time. The system then ranks each remaining merchant based on a ratio of: (i) the number of card members having at least one financial transaction with both the first merchant and the remaining merchant over the period of time; to (ii) the number of financial transactions involving card members over the period of time. A corrective factor may be introduced to eliminate merchants having relatively few card member transactions. The system then reports one or more of the highest-ranked remaining merchants in which card members have had at least one financial transaction with both merchants over the period of time. The ranking of merchants may then be provided to card members or interested merchants for marketing purposes.

In various example, the processes disclosed herein are particularly useful for identifying restaurants or vacation destinations that may be of interest to card members, but may be applied to any of a variety of products, services and offerings.

Further features and advantages of the present invention as well as the structure and operation of various embodiments of the present invention are described in detail below with reference to the accompanying drawings.

BRIEF DESCRIPTION OF THE DRAWINGS

The features of the present invention will become more apparent from the detailed description set forth below when taken in conjunction with the drawings. The left-most digit of a reference number identifies the drawing in which the reference number first appears.

FIG. 3 is a diagram of an exemplary collaborative filtering database for use with the process of FIG. 2.

DETAILED DESCRIPTION

Overview

The collaborative filtering processes now introduced allows a credit, debit, stored value or charge card provider, such as AMERICAN EXPRESS, to analyze financial transaction data involving its card members (i.e., holders of a particular brand of credit instrument) that is typically used only for billing purposes. The system also harnesses such information in order to assist consumers in making other purchases at merchants that have appealed to other (similarly-situated) card members. According to such processes, merchants who accept a particular brand of credit instrument are grouped by location and industry code. Financial transactions between card members and the various merchants within one or more groups are analyzed to identify those merchants with common card member patronage, and to further rank merchants within a group that have had common patronage among card members. The ranking of similar merchants may be reported to card members who have made at least one purchase from a merchant within the group in order to assist the card members in making their purchases at similar merchants. Such reporting may be accompanied by discounts on purchases at such other merchants, if desired. The ranking of merchants may also be communicated to the merchants themselves (in a manner such that card member privacy without is not violated), who may then properly use such information for their marketing purposes.

Exemplary Systems and Processes

Referring now to FIGS. 1-4, wherein similar components of the present disclosure are referenced in like manner, and wherein various embodiments of a method and system for collaborative filtering of card member transactions are disclosed.

Figure 1:
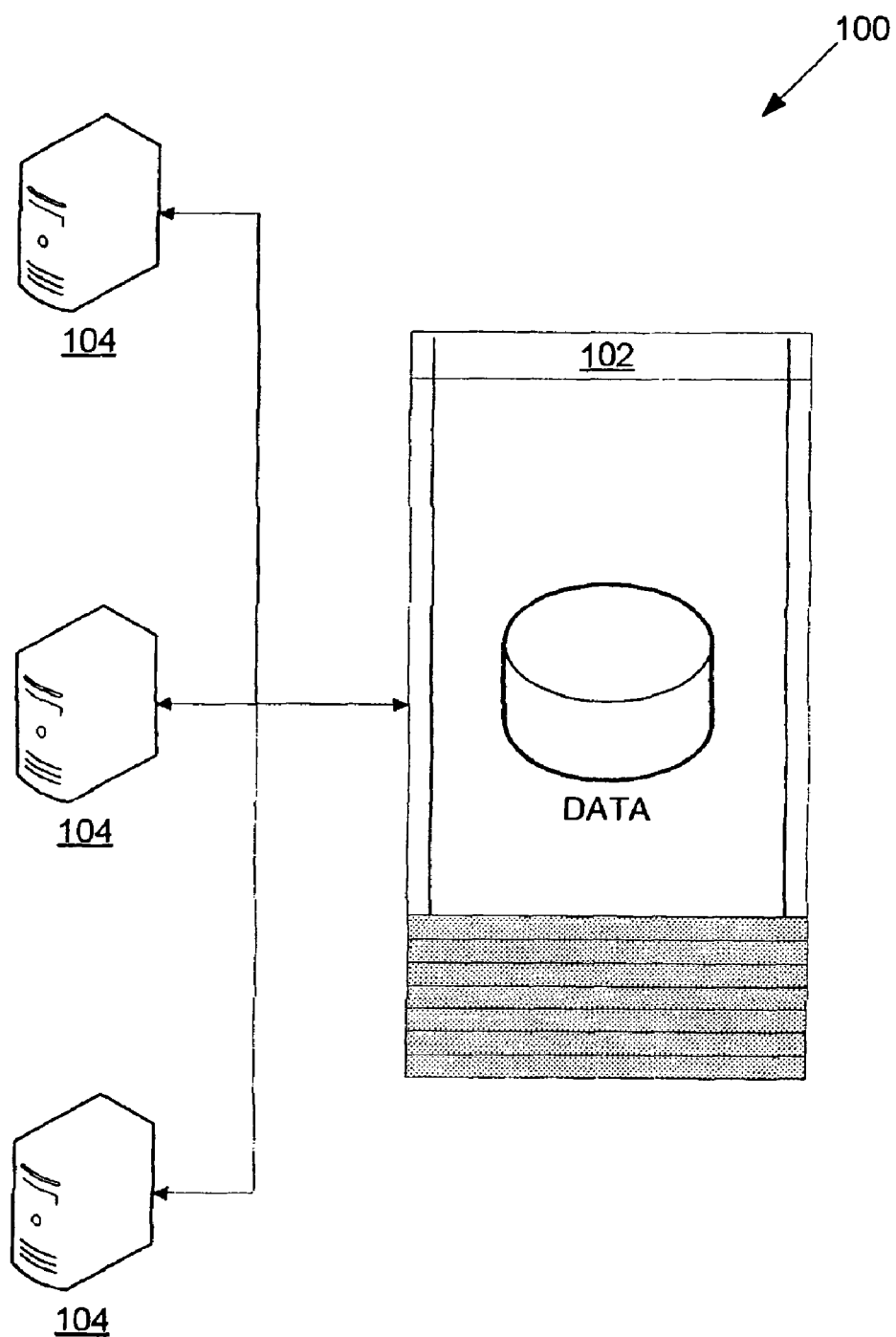
FIG. 1 is a block diagram of an exemplary computer network over which the processes of the present disclosure may be performed.

Turning to FIG. 1, there is depicted an exemplary computer network 100 over which the transmission of financial transaction data as described herein may be accomplished, using any of a variety of available computing components for processing such data. Such components may include a credit provider server 102, which may be a computer, such as an enterprise server of the type commonly manufactured by SUN MICROSYSTEMS. The credit provider server 102 has appropriate internal hardware, software, processing, memory and network communication components, which enables it to perform the functions described herein. General software applications may include the SOLARIS operating system and SYBASE IQ data management and analysis tools. The credit provider server 102 stores financial transaction data in appropriate memory and processes the same according to the processes described herein using programming instructions that may be provided in any of a variety of useful machine programming languages. It should be readily apparent that any number of other computing systems and software may be used to accomplish the processes described herein.

The credit provider server 102 may, in turn, be in operative communication with any number of other external servers 104, which may be computers or servers of similar or compatible functional configuration. These external servers 104 may gather and provide financial transactions data, as described herein, and transmit the same for processing and analysis by the credit provider server 102. Such data transmissions may occur for example over the Internet or by any other known communications infrastructure, such as a local area network, a wide area network, a wireless network, a fiber-optic network, or any combination or interconnection of the same. Such communications may also be transmitted in an encrypted or otherwise secure format, in any of a wide variety of known manners. Each of the external servers 104 may be operated by either common or independent entities, and in certain embodiment may represent point-of-sale terminals where card member transactions are initiated, or may be servers operated by credit card clearinghouses that typically process credit transactions.

Figure 2:
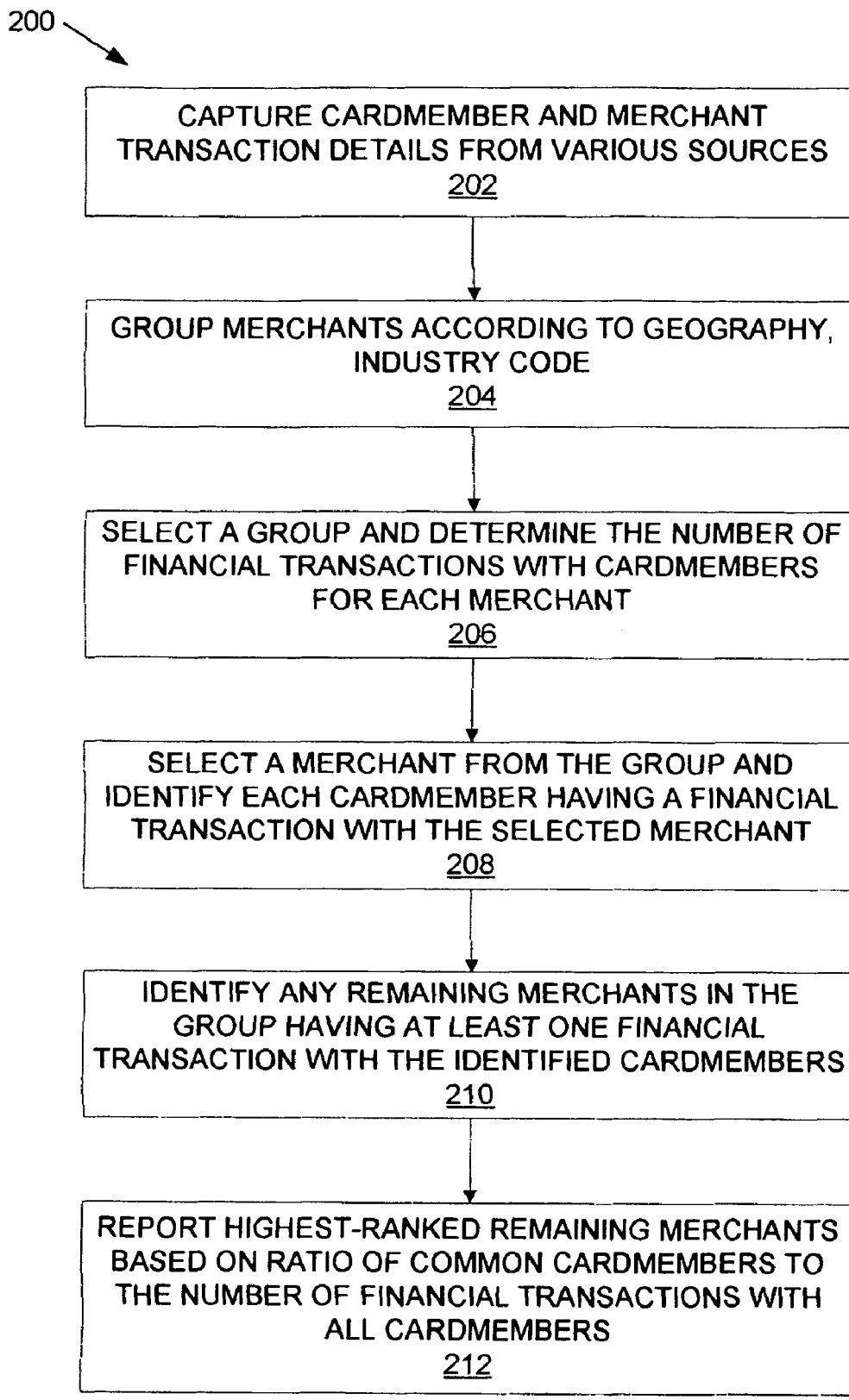
FIG. 2 is a flowchart of an exemplary collaborative filtering process performed over the network of FIG. 1.

Turning now to FIG. 2, therein is depicted an exemplary collaborative filtering process 200 performed by the credit provider server 102 using the financial transaction data obtained by and transmitted from the external servers 104.

The process 200 commences with the capture of financial transaction data involving a plurality of card members and merchants over a period of time (step 202). Such financial transaction data may include, but is not limited to, an identification of the card member (such as by name and/or account number), an identification of the merchant (such as by name or merchant identification number), a financial amount of the transaction, and the date of the transaction. The period of time may be for example a month, a quarter, a year or any other desired period of time. The credit provider server 102 may store such received data in a suitable database format for analysis as described herein.

Next, the credit provider server 102 groups similar merchants having transactions with card members according to their geographic location and an applicable industry code (step 204). The grouping of the merchants by geographic location may be accomplished according to the zip code, street address, city, metropolitan area (MSA) or county in which the merchants reside, which is typically readily available to credit providers. The grouping by geographic location ensures that card members who have frequented a merchant in that location may be amenable to visiting other merchants in the same location.

The further grouping of merchants by industry code ensures that the merchants within the group offer similar products and services. The industry code may be a Standard Industry Classification (SIC) code that may be assigned to merchants by a government agency. The industry code may further be a proprietary classification code assigned by a credit provider, issuer, or acquirer to a class of merchants to uniquely identify the products or services offered by such merchants.

Next, at step 206, a group of merchants is selected for analysis wherein the number of financial transactions with card members is determined and stored for each merchant in the group. This information may then be stored by the credit provider server 102 in a database, such as database 300 described below with respect to FIG. 3.

Next, at step 208, a merchant is selected from the group, and each card member having at least one transaction with that merchant is identified from the stored financial transaction data.

Next, at step 210, it is determined whether any other merchants within that group have had transaction with any of the card members identified in step 208 above. Those merchants having transactions with common card members are identified and ranked based on a ratio of the number of number of transactions with common card members to the total number of transactions with all card members determined in step 206 above.

One exemplary method for ranking merchants will now be described with reference to FIG. 3 wherein an exemplary merchant ranking database 300 used by the collaborative filtering process 200 is depicted. The database 300 has a number of fields represented by columns in FIG. 3 and a number of database records, represented as rows within FIG. 3. This database 300 may include: (i) a first merchant identifier field 302 for storing an identification of a first merchant being analyzed by the collaborative filtering process 200; (ii) a second merchant identifier field 200 for storing an identification of similar merchants having transactions with common cardholders; (iii) a number of common card members field 306 for storing a number of card members who have frequented both the merchants identified in fields 302 and 304; a number of total transactions field 308 for storing the total number of card member transactions involving the second merchant identified in field 304; a ratio field 310 for storing the ratio of the value stored in field 306 to the value stored in field 308; and a ranking field that stores the result of a ranking applied to the data in fields 306-308.

A problem exists with simply using the ratio value 310 to directly rank similar merchants within a group. This problem becomes apparent when the number of shared card members is low, or is close to the total number of transactions at the second merchant. Either scenario, or a combination of the two, would result in a ratio of nearly 1:1. However, particularly in the case where there are few shared card member transactions, simply using the highest ratios may not be representative of a true correlation between the patronage of the first and second merchants.

Accordingly, a mathematical solution may be applied that discounts such problematic data. One such solution may be expressed as follows:

$$C = A + (10 * B * (A - 3))$$

where:

C is the value stored in field 312;

A is the value stored in field 306;

B is the ratio value stored in field 310, obtained by dividing the value stored in field 306 by the value stored in field 308; and the value of (A−3) is set to zero if it results in zero or a negative number.

It should be noted that, in one embodiment, the corrective factor 10*B*(A−3) has been incorporated to discount coincidences from merchants having relatively few numbers of common card member transactions, and add weight to those with higher ratios and numbers of common transactions. The variables in the corrective factor were determined to be suitable based on experimental data and may be altered or adjusted based on empirical data resulting from actual use of the collaborative filtering processes. Other suitable corrective factors may also be applied.

Returning to the process 200, upon completion of the analysis in step 210 above, each of the remaining merchants within the group are ranked according to the value stored in field 312 for them, wherein the highest-ranked second merchant has the highest ranking value and the lowest-ranked second merchant has the lowest ranking value. The credit provider server may rank only a threshold number of second merchants, such as the top five merchants.

Figure 4:
FIG. 4 is a diagram of exemplary ranking results using the collaborative filtering process of FIG. 2.

These merchants may then be stored in a merchant ranking database 400 shown in FIG. 4. An exemplary merchant ranking database 400 includes the following fields: (i) a primary merchant field 402 for storing an identification of a first merchant in a group; (ii) a highest ranked merchant field 404 for storing the highest ranked merchant in the group based on its ranking; (iii) a second-highest ranked merchant field 404 for storing an identification of the second highest ranked merchant in the group; and (iv) third though fifth highest-ranked merchant fields 408-412 for storing the respective appropriate merchant identifications.

The merchant rankings stored in database 400 may be reported to card members in any of a variety of manners. In one example, the collaborative filtering processes could be used to identify restaurants that a card member may wish to try. Suppose Card member A recently ate at a Sushi Restaurant in Manhattan. The collaborative filtering process 200 could be used to identify and report the highest-ranked restaurants (based on similar industry codes, and therefore, similar services) where other card members who have dined at the Sushi Restaurant have also dined. Based on Card member A's patronage of the Sushi Restaurant, a report of these highest ranked restaurants may be provided with Card member A's billing statement or otherwise communicated to the card member by, for example, a separate mailing, electronic means (e.g., e-mail) or telemarketing means.

In another example of the collaborative filtering process, card members who are identified as having vacationed in a certain destination could be informed of other top vacation destinations by other card members who have also vacationed at that destination. Such vacation destinations may or may not be grouped by similar geographic location or similar merchants, but instead may simply be based on overall card member preferences.

In one embodiment, the ranking information produced by the collaborative filtering process described herein may be provided to merchants themselves. For example, a restaurateur may learn that many customers of a competing restaurant also tend to frequent their establishment. The restaurateur may then offer to accept coupons from that competitor in order to attract new customers.

The disclosed collaborative filtering processes solve several problems by allowing a credit provider and merchants to customize promotions or marketing offers, while at the same time providing a value-added benefit for card members, by providing them with meaningful information about merchants they may want to patronize due to patronage from other (presumably similarly-situated) card members who carry and utilize the same particular brand of credit instrument. The process leverages the ability to personalize information based on purchases already made by card members. By providing such personalized information to card members, a credit provider can expect to experience an increase in revenues due to transactions that are encouraged by the collaborative filtering process.

CONCLUSION

While various embodiments of the present invention have been described above, it should be understood that they have been presented by way of example, and not limitation. It will be apparent to persons skilled in the relevant art(s) that various changes in form and detail can be made therein without departing from the spirit and scope of the present invention (e.g., packaging and activation of other transaction cards and/or use of batch activation processes). Thus, the present invention should not be limited by any of the above described exemplary embodiments, but should be defined only in accordance with the following claims and their equivalents.

In addition, it should be understood that the figures and screen shots illustrated in the attachments, which highlight the functionality and advantages of the present invention, are presented for example purposes only. The architecture of the present invention is sufficiently flexible and configurable, such that it may be utilized (and navigated) in ways other than that shown in the accompanying figures.

Further, the purpose of the following Abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The Abstract is not intended to be limiting as to the scope of the present invention in any way.

What is claimed is:

1. A tangible, non-transitory computer-readable storage medium containing instructions that, when executed by a processor, causes the processor to perform operations comprising:

receiving information corresponding to a plurality of merchants;

determining a group of the plurality of merchants based on an industry code and a geographic location;

receiving information corresponding to a number of financial transactions involving account holders during a period of time;

determining, for each merchant of the plurality of merchants, the financial transactions involving account holders during the period of time;

determining, a first value for each pair of, (a) a first merchant of the plurality of merchants, and (b) each remaining merchant, the first value corresponding to the number of account holders having at least one financial transaction with the first merchant and the remaining merchants during the period of time;

determining a second value for each of the remaining merchants of the plurality of merchants other than the first merchant, the second value corresponding to the number of account holders having at least one financial transaction with each of the remaining merchants during the period of time;

determining a third value corresponding to a ratio of the first value to the second value;

determining a fourth value corresponding to the third value multiplied by a corrective factor to account for a significance of financial transactions, the fourth value comprising, $$C=A+(W1*B*(A-W2))$$

wherein,
C=the fourth value
A=the first value
B=the third value
W1=a first weighting factor
W2=a second weighting factor,
wherein the corrective factor comprises,
reducing the third value based on a reduced significance of transactions occurring between the first merchant and merchants having a number of financial transactions below a threshold number with both the first merchant and each of the remaining merchants during the period of time,
increasing the third value based on an increased significance of transactions occurring between the first merchant and merchants having a number of financial transactions above the threshold number with both the first merchant and each of the remaining merchants during the period of time; and
determining a ranking of each remaining merchant based on the fourth value.

2. The computer-readable storage medium of claim 1, further comprising:
offering a discount on a purchase from at least one of the remaining merchants to account holders having at least one financial transaction with the first merchant during the period of time.

3. A tangible, non-transitory computer-readable storage medium containing instructions that, when executed by a processor, causes the processor to perform a method, the method comprising:
receiving information corresponding to a plurality of merchants;
determining a group of the plurality of merchants based on an industry code and a geographic location;
receiving information corresponding to a number of financial transactions involving account holders during a period of time;
determining, for each merchant of the plurality of merchants, the financial transactions involving account holders during the period of time;
determining, a first value for each pair of,
(a) a first merchant of the plurality of merchants, and
(b) each remaining merchant,
the first value corresponding to the number of account holders having at least one financial transaction with the first merchant and the remaining merchants during the period of time;
determining a second value for each of the remaining merchants of the plurality of merchants other than the first merchant, the second value corresponding to the number of account holders having at least one financial transaction with each of the remaining merchants during the period of time;

determining a third value corresponding to a ratio of the first value to the second value;
determining a fourth value, the fourth value comprising, $$C=A+(W1*B*(A-W2))$$

wherein,
C=the fourth value
A=the first value
B=the third value
W1=a first weighting factor
W2=a second weighting factor
determining a ranking of each remaining merchant based on the fourth value.

4. The computer-readable storage medium of claim 1, wherein the plurality of merchants are restaurateurs.

5. The computer-readable storage medium of claim 4, wherein the plurality of restaurateurs offer similar cuisine.

6. A non-transitory tangible computer readable medium having computer executable instructions recorded thereon that, when executed by a processor causes to the processor to execute the instructions, such instructions comprising:
instructions to group a plurality of merchants based on an industry code and a geographic location;
instructions to determine a first value for each pair of,
(a) a first merchant of the plurality of merchants, and
(b) each remaining merchant,
the first value corresponding to the number of account holders having at least one financial transaction with the first merchant and the remaining merchants during the period of time;
instructions to determine a second value for each of the remaining merchants of the plurality of merchants other than the first merchant, the second value corresponding to the number of account holders having at least one financial transaction with each of the remaining merchants during the period of time;
instructions to determine a third value corresponding to a ratio of the first value to the second value;
instructions to determine a fourth value corresponding to the third value multiplied by a corrective factor to account for a significance of financial transactions, the fourth value comprising, $$C=A+(W1*B*(A-W2))$$

wherein,
C=the fourth value
A=the first value
B=the third value
W1=a first weighting factor
W2=a second weighting factor,
wherein the corrective factor comprises:
reducing the third value based on a reduced significance of transactions occurring between the first merchant, and merchants having a number of financial transactions below a threshold number with both the first merchant and each of the remaining merchants during the period of time, and
increasing the third value based on an increased significance of transactions occurring between the first merchant, and merchants having a number of financial transactions above the threshold number with both the first merchant and each of the remaining merchants during the period of time; and
instructions to rank each remaining merchant based on the fourth value.

7. An apparatus for processing financial transaction data from a plurality of account holders, comprising:

a processor; and an instruction memory in communication with the processor, the instruction memory for storing a plurality of processing instructions directing the processor to:

group a plurality of merchants based on an industry code and a geographic location;

determine, for each merchant of the plurality of merchants, a number of financial transactions involving account holders during a period of time;

determine a first value for each pair of,
- (a) a first merchant of the plurality of merchants, and
- (b) each remaining merchant, the first value corresponding to the number of account holders having at least one financial transaction with the first merchant and the remaining merchants during the period of time;

determine a second value for each of the remaining merchants of the plurality of merchants other than the first merchant, the second value corresponding to the number of account holders having at least one financial transaction with each of the remaining merchants during the period of time;

determine a third value corresponding to a ratio of the first value to the second value;

determine a fourth value corresponding to the third value multiplied by a corrective factor to account for the significance of financial transactions, the fourth value comprising, $$C=A+(W1*B*(A-W2))$$

wherein,
C=the fourth value
A=the first value
B=the third value
W1=a first weighting factor
W2=a second weighting factor, wherein the corrective factor comprises:
reducing the third value based on a reduced significance of transactions occurring between the first merchant, and merchants having a number of financial transactions below a threshold number with both the first merchant and each of the remaining merchants during the period of time, and
increasing the third value based on an increased significance of transactions occurring between the first merchant, and merchants having a number of financial transactions above the threshold number with both the first merchant and each of the remaining merchants during the period of time; and rank each of the remaining merchants based on the fourth value.

8. A method, comprising:

receiving information corresponding to a plurality of vacation destinations visited by account holders;

storing, in a tangible memory device, the vacation destination information;

using vacation destination characteristics to group the plurality of vacation destinations visited by the account holders in the memory device;

electronically determining, by a processing device, a first value for each pair of,
- (a) a first vacation destination of the plurality of vacation destinations, and
- (b) each remaining vacation destination, the first value corresponding to the number of account holders having at least one financial transaction with the first vacation destination and the remaining vacation destinations during a period of time;

electronically determining, by the processing device, a second value for each of the remaining vacation destinations of the plurality of vacation destinations other than the first vacation destination, the second value corresponding to the number of account holders having at least one financial transaction with each of the remaining vacation destinations during the period of time;

electronically determining, by the processing device, a third value corresponding to a ratio of the first value to the second value;

electronically determining, by the processing device, a fourth value corresponding to the third value multiplied by a corrective factor to account for the significance of financial transactions, the fourth value comprising, $$C=A+(W1*B*(A-W2))$$

wherein,
C=the fourth value
A=the first value
B=the third value
W1=a first weighting factor
W2=a second weighting factor, wherein the corrective factor comprises:
reducing the third value based on a reduced significance of transactions occurring between the first merchant, and merchants having a number of financial transactions below a threshold number with both the first merchant and each of the remaining merchants during the period of time, and
increasing the third value based on an increased significance of transactions occurring between the first merchant, and merchants having a number of financial transactions above the threshold number with both the first merchant and each of the remaining merchants during the period of time; and electronically ranking, by the processing devices, each of the remaining ones of the vacation destinations based on the fourth value.

9. The computer-readable storage medium of claim 3, wherein the corrective factor further comprises a calculated corrective factor based empirical data.

10. The method of claim 8, wherein the ranking step further comprises ranking based on ratings of the vacation destinations received from account holders.

11. A system comprising:

means for receiving information corresponding to a plurality of merchants;

means for determining a group of the plurality of merchants based on an industry code and a geographic location;

means for receiving information, at a processing device, corresponding to a number of financial transactions involving account holders during a period of time;

means for determining, for each merchant of the plurality of merchants, the financial transactions involving account holders during the period of time;

means for determining a first value for each pair of,
- (a) a first merchant of the plurality of merchants and
- (b) each remaining merchant, the first value corresponding to the number of account holders having at least one financial transaction with the first merchant and the remaining merchants during the period of time;

means for determining a second value for each of the remaining merchants of the plurality of merchants other than the first merchant, the second value corresponding to the number of account holders having at least one financial transaction with each of the remaining merchants during the period of time;

means for determining a third value corresponding to a ratio of the first value to the second value;

means for determining a fourth value corresponding to the third value multiplied by a corrective factor to account for the significance of financial transactions, the fourth value comprising, $$C = A + (W1 * B * (A - W2))$$

wherein,
C = the fourth value
A = the first value
B = the third value
W1 = a first weighting factor
W2 = a second weighting factor, wherein the corrective factor comprises:
reducing the third value based on a reduced significance of transactions occurring between the first merchant, and merchants having a number of financial transactions below a threshold number with both the first merchant and each of the remaining merchants during the period of time, and increasing the third value based on an increased significance of transactions occurring between the first merchant, and merchants having a number of financial transactions above the threshold number with both the first merchant and each of the remaining merchants during the period of time; and means for determining a ranking of each remaining merchant based on the fourth value.

* * * * *